Figure 3:
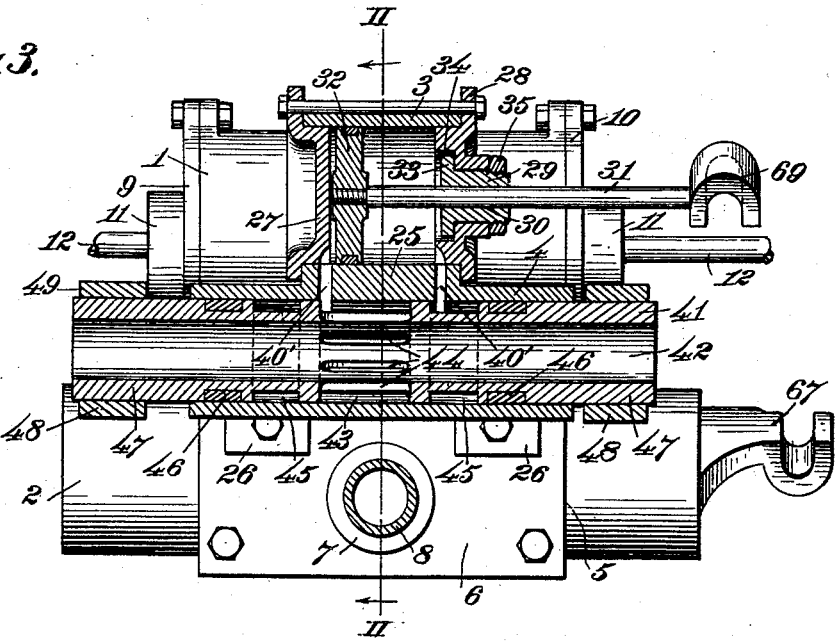

H. T. FARNSWORTH.
WATER MOTOR.
APPLICATION FILED APR. 14, 1909.
959,491.
Patented May 31, 1910.
4 SHEETS—SHEET 1.
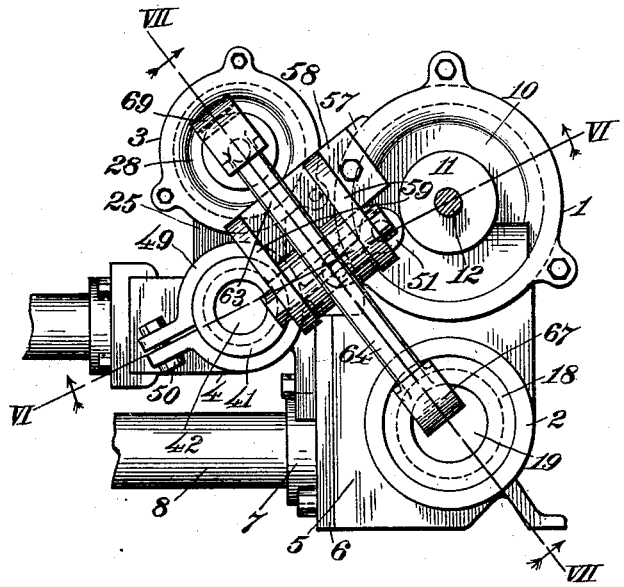
Inventor
Henry T. Farnsworth
Witnesses
W. S. Austin
M. R. Alford
By Joshua R. H. Potts
Attorney

H. T. FARNSWORTH.
WATER MOTOR.
APPLICATION FILED APR. 14, 1909.

959,491.

Patented May 31, 1910.
4 SHEETS—SHEET 2.

Witnesses
W. J. Austin
M. R. Alford

Inventor
Henry T. Farnsworth

By Joshua R. H. Potts
Attorney

H. T. FARNSWORTH.
WATER MOTOR.
APPLICATION FILED APR. 14, 1909.

959,491.

Patented May 31, 1910.
4 SHEETS—SHEET 3.

Witnesses
W. J. Austin
M. R. Alford

Inventor
Henry T. Farnsworth

By Joshua R. H. Potts
Attorney

H. T. FARNSWORTH.
WATER MOTOR.
APPLICATION FILED APR. 14, 1909.
959,491.
Patented May 31, 1910.
4 SHEETS—SHEET 4.
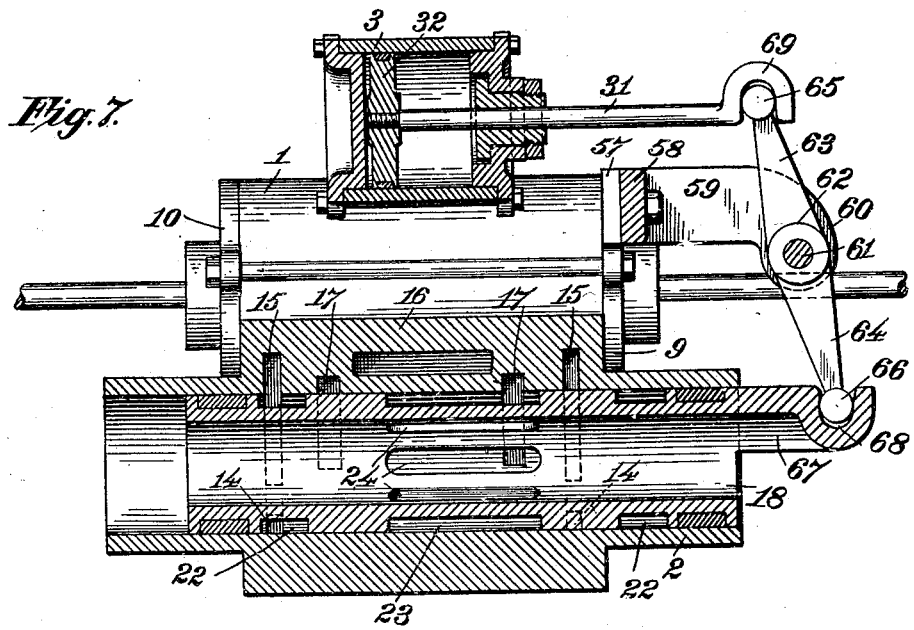
Fig. 7.
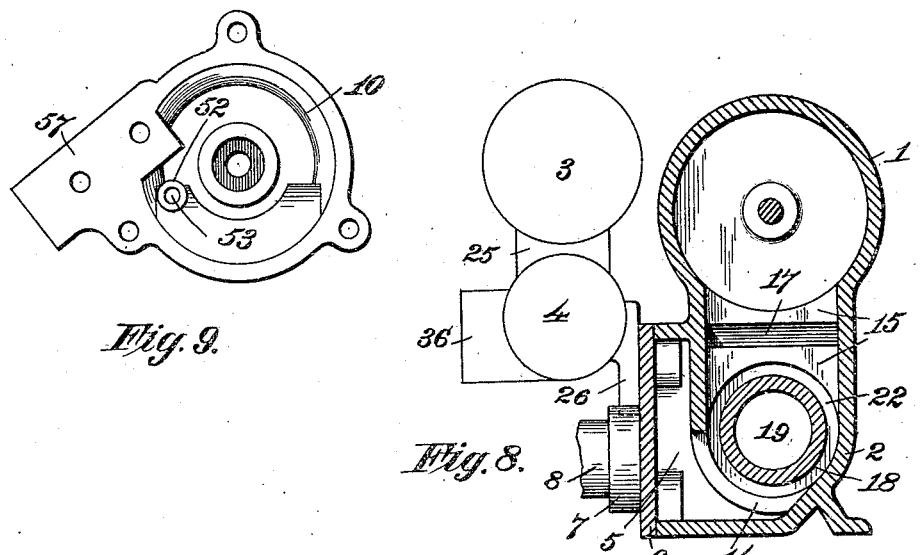
Fig. 9.
Fig. 8.
Witnesses
W. J. Austin
M. R. Alford
Inventor
Henry T. Farnsworth
By Joshua R. H. Potts
Attorney

UNITED STATES PATENT OFFICE.

HENRY T. FARNSWORTH, OF ALTAVISTA, VIRGINIA.

WATER-MOTOR.

959,491.  Specification of Letters Patent.  Patented May 31, 1910.

Application filed April 14, 1909. Serial No. 489,822.

*To all whom it may concern:*

Be it known that I, HENRY T. FARNSWORTH, a citizen of the United States, residing at Altavista, county of Campbell, and State of Virginia, have invented certain new and useful Improvements in Water-Motors, of which the following is a specification.

My invention relates to water motors, and the object of my invention is to provide a water motor which shall positively have no "dead centers", to the end that the same shall not stop when in operation so long as the water pressure within the cylinder is maintained, unless over-powered by a great resistance.

A further object of my invention is to provide a water motor of the class mentioned which shall be of great efficiency, but little of the power being used to shift or change the valves.

A further object of my invention is to provide a water motor, the cylinder or cylinders of which shall be practically self-cleaning and in which the valves may be readily removed for cleaning and as readily replaced.

A further object of my invention is to provide a water motor especially designed for great power and heavy work.

A further object of my invention is to provide a water motor of such improved design and construction as to obviate or dispense with the hammering incident to motors of this class.

Other objects will appear hereinafter.

With these objects in view, my invention consists generally in a main or power cylinder provided with a piston, a valve for controlling the inlet and exhaust of water to and from said cylinder, an auxiliary cylinder and piston for actuating the valve of the main cylinder and a valve for controlling the inlet and exhaust or water to and from the auxiliary cylinder.

My invention further consists in a motor as above mentioned equipped with means actuated by the main piston when at or near the end of each stroke for shifting the valve of the auxiliary cylinder.

My invention further consists in various details of construction and arrangements of parts all as will be fully described hereinafter and particularly pointed out in the claims.

Figure 4:
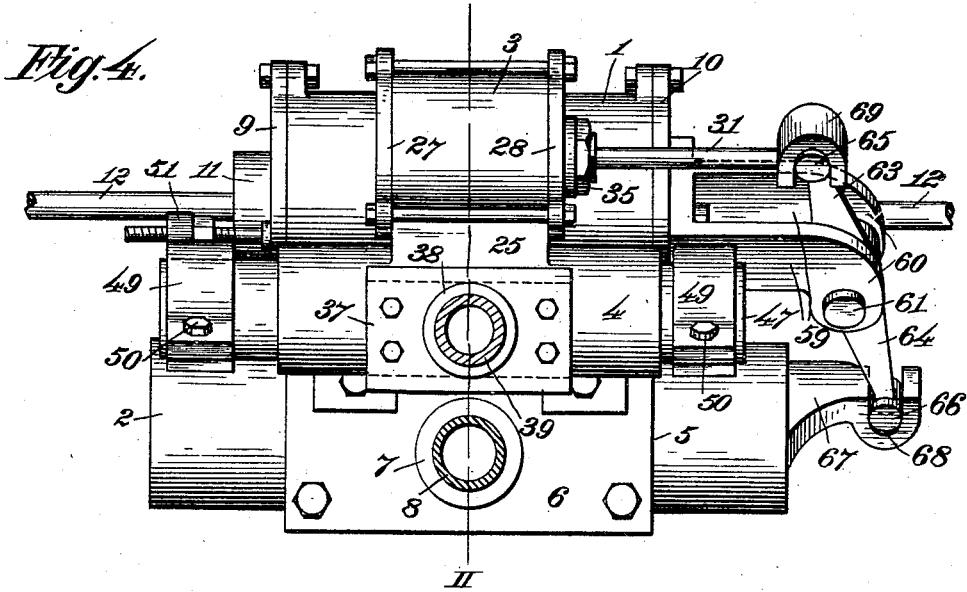
Figure 5:
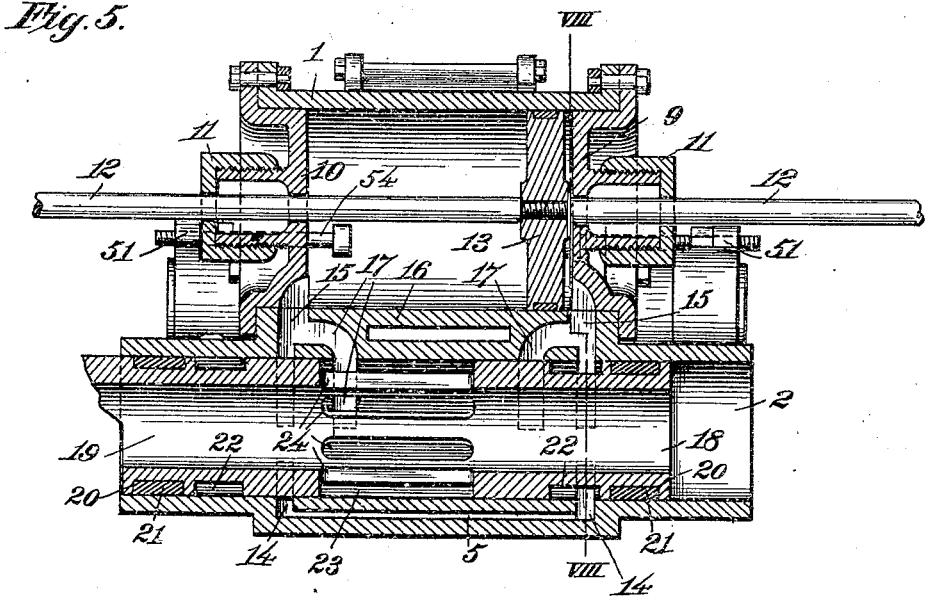
Figure 6:
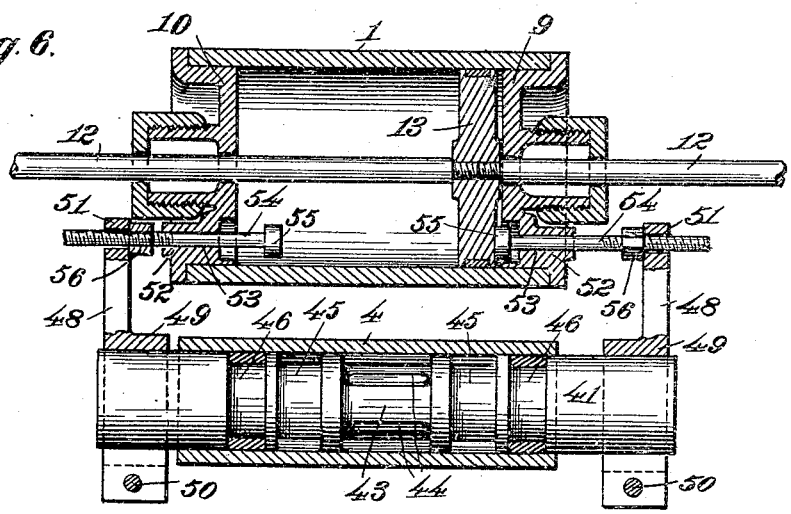

My invention will be more readily understood by reference to the accompanying drawings forming a part of this specification and in which, Figure 1 is an end elevation of a water motor embodying my invention in its preferred form. Fig. 2 is a central transverse vertical section to the device taken on substantially the line II—II of Figs. 3 and 4. Fig. 3 is a vertical longitudinal section taken on line III—III of Fig. 2. Fig. 4 is a side elevation of the motor. Fig. 5 is a vertical longitudinal section taken on the line V—V of Fig. 2. Fig. 6 is a longitudinal section taken on the line VI—VI of Fig. 1. Fig. 7 is a longitudinal section taken on the line VII—VII of Fig. 1. Fig. 8 is a vertical transverse section taken on the line VIII—VIII of Fig. 5. Fig. 9 is a detail view of one of the main cylinder heads, and Fig. 10 is a detail section on the line X—X of Fig. 2.

Referring now to the drawings, 1 indicates the main or power cylinder, 2 the main valve shell, 3 the auxiliary cylinder and 4 the auxiliary valve shell. The cylinder 1 and valve shell 2 are preferably formed in a single casting and the cylinder 3 and valve shell 4 are also formed in a single casting and secured to the first said casting. Cast integrally with the portions 1 and 2 is a water box 5 closed by a removable plate or closure 6, the latter being provided with an internally threaded collar 7 to receive the supply pipe 8. The valve shell 2 is preferably cylindrical as shown and is considerably longer than the cylinder 1. The cylinder 1 is provided with the removable heads 9 and 10 each provided with a stuffing box 11 through which extend the piston rods 12.

13 indicates the main piston within the cylinder 1 and to which the piston rods 12 are secured as shown clearly in Figs. 5 and 6.

The water box 5 communicates with the valve casing 2 through inlet ports 14 arranged at each end of said box, and the inlet ports are continued as at 15 in the walls 16 between the cylinders 1 and 2 forming a communication with the interior of the cylinder 1. The cylinder 1 also communicates with the valve shell or chamber 2 through exhaust ports 17—17. The exhaust ports 17 converge with the respective ports 15 at a point in the walls 16 between the cylinders and extend inwardly and downwardly as shown clearly in Fig. 5. Slidably mounted within the cylinder 2 is a hollow cylindrical valve 18 having a central bore 19 open at both ends. The valve 18 is provided with annular packing grooves 20 at each end in which are the packing rings 21.

22—22 indicate annular grooves formed in the outer face of the valve 18 adjacent each end and adapted to register alternately with their respective inlet ports establishing a communication between the ports 14 and 15. See Figs. 5 and 8.

Arranged centrally of the valve 18 is an annular external groove 23 which is considerably wider than the grooves 22 and registers alternately with the exhaust ports 17. The exhaust port groove 23 communicates with the bore 19 of the valve 18 through a series of apertures 24 which extend longitudinally of the valve the full width of the groove 23. As shown in Fig. 5 the piston 13 is at the end of its stroke to the right and ready to begin its return stroke and the valve 18 is set to admit the water to the right hand end of the cylinder and to exhaust from the left hand end. It will be seen that when in this position the valve closes the right hand exhaust port 17 and the left hand inlet port 15. When the piston 13 reaches the opposite end of its stroke the valve 18 is shifted to close the right hand inlet port and the left hand exhaust and open the left hand inlet port and the right hand exhaust, the groove 23 and apertures 24 serving as common means of communication for both port 17 with the bore 19, the water from the exhaust flowing freely out of each end of the valve and its shell 2. The means for shifting the valve will be described hereinafter.

As before stated, the auxiliary cylinder 3 and its valve shell 4 are formed in one casting connected by the intervening wall 25, and is provided with a pair of lugs or ears 26 by means of which the casting is secured to the main cylinder and valve casting or more accurately to the water box closure 6. The cylinder is quite short and is provided with the cylinder heads 27 and 28, the latter being provided with a removable sleeve 29 having a bore 30 through which the piston rod 31 extends.

32 indicates the auxiliary piston in the cylinder 3 to which the piston rod 31 is connected.

The sleeve 29 is provided with an annular flange or head 33 which fits in a recess 34 provided for the same in the inner face of the head 28. The outer end of the sleeve is threaded and provided with a nut 35 for securing the same in position.

The valve shell 4 comprises a cylindrical member open at both ends and considerably longer than the cylinder 3. Arranged centrally of the shell 4 is a water chamber 36 provided with a closure 37 having an internally threaded boss 38 to receive the end of the inlet pipe 39 for supplying the water to the auxiliary cylinder.

40—40 indicate ports extending from the water chamber 36 into the cylinder or valve shell 4 and 40′—40′ ports extending from the shell 4 into the cylinder 3 at the ends thereof, respectively. Slidably mounted within the shell 4 is a cylindrical valve 41 having a central bore 42 open at both ends. The valve 41 is provided with a central annular exhaust groove 43 in its outer face adapted to register alternately with the ports 40 and provided with apertures 44 forming a communication between said ports and the bore 42 of the valve, the exhaust water pouring out both ends of the valve. A short distance to each side of the groove 40 is an annular circumferential inlet groove 45 adapted to register alternately with the respective inlet ports and forming a communication between the ports 40—40 admitting water from the water chamber 36 to the cylinder 4.

46—46 indicate packing grooves arranged beyond the grooves 45.

The valve 41 is longer than its shell or cylinder 4 thereby leaving the ends 47 projecting considerably beyond the ends of the shell. To said projecting ends are detachably and adjustably secured arms 48, said arms being provided with a split ring 49 and a clamping bolt 50 for securing the same to the valve. The outer ends of the arms 48 are provided with eyes 51. The heads 9 and 10 of the cylinder 1 are each provided with a sleeve 52 having a bore 53 in which is slidably mounted a rod 54. Each rod 54 is provided at its inner end with a head 55 and its outer end extends through the eye 51 of the respective arm 48, the same extending freely therethrough. The rods 54 are threaded and each provided with a nut 56 which is arranged between the arm 48 and the cylinder. The heads 55 of the rods are arranged in the path of the piston 13 so that as the piston reaches or approaches the end of its stroke it engages the rod and shifts the valve 41. It is obvious that by adjusting the position of the arms 48 on the valve 41 and the position of the nuts 56 on the rods 54 the shifting of the valve 41 may be accurately timed. As soon as the valve 41 is shifted, the auxiliary piston is moved to the opposite end of its cylinder and suitable means are provided whereby the moving of the auxiliary piston will shift the main valve 18 to reverse the stroke of the main or working piston 13.

The cylinder head 10 is provided with an extension plate or seat 57 formed integrally therewith and extending laterally to a position between the axes of the cylinders 2 and 3. Secured to the plate or seat 57 is a bracket comprising a base 58 and a pair of parallel outwardly extending arms 59 terminating in the curved outer ends 60 forming bearings for a bolt 61. Mounted on the bolt 61 is a rock lever 62 comprising the arms 63, 64 terminating at the ends in transverse cylindrical members 65 and 66 respectively. The valve 18 is provided with an extension 67 in which is formed a cylindrical bearing to receive the member 66, and the end of the piston rod 31 is provided with a cylindrical bearing member 69 similar to the member 68 to receive the member 65. It is obvious that as the piston 32 is shifted the valve 18 will also be shifted but in the opposite direction.

The operation of the device is as follows: Assuming that the main piston 13 is moving toward the left, (that is, toward the right in Figs. 5 and 6, these figures being reversed from the remaining figures of the drawing) as it approaches the end of the stroke it engages the left hand rod 54, pushing the same outwardly. The nut 56 on said rod engages the eye on the end of the adjacent arm and moves said arm together with the auxiliary valve 41 to the left as in Fig. 3. The right hand inlet groove 45 then registers with the right hand ports 40, 40′ admitting water under pressure to the right hand end of cylinder 3 forcing the piston 32 therein to the left. As the piston 32 moves to the left it moves the main valve 18 to the right through the medium of the arm 62. Communication is then established between the water box 5 and the cylinder 1 behind the piston 13 through the left hand port 14, groove 22 and left hand port 15, driving the piston to the right. The water in front of the piston 13 exhausts through the port 17, groove 23 and apertures 24, pouring out of both ends of the valve and valve cylinder. As the piston 13 approaches the end of its right hand stroke, it engages the right hand rod 54 and moves the same together with the valve 41 to the right, admitting water under pressure from the water chamber 36 to the left hand end of cylinder 30, driving the piston 32 to the right, the exhaust from cylinder 3 escaping through the groove 43 and apertures 44, pouring out of both ends of the valve 41. This moves the main valve 18 to the left and reverses the movement of the main piston.

It is obvious that as long as there is pressure within the water chambers 5 and 36 the device will not stop unless overcome by a resistance greater than the force due to the head of water, for as soon as either of the pistons reach the end of its stroke, it shifts the valve of the other piston causing the same to reverse. Furthermore the device is of great efficiency, the only reduction from the maximum power of the main piston being the slight force required to shift the auxiliary valve at or near the end of each stroke.

By arranging the valves and valve chambers below their respective cylinders with the ports opening from beneath the cylinders, the sand and dirt which may be in the water is constantly flushed out of the cylinders and escapes through the open ends of the valve. The cylinders are thus kept clean and free from substances which would tend to clog the action of the device. If for any reason the valves should become clogged from grit they may be readily removed for cleaning. By loosening one of the bolts 50 one of the arms may be removed from the valve 41 after which the valve will readily slip from its casing. To remove the valve 18 the bolt 61 is removed after which the valve may be readily withdrawn from the casing 2.

Having described my invention what I claim as new and desire to secure by Letters Patent is:

1. In a water motor a power cylinder and piston therein, a main valve for said cylinder, an auxiliary cylinder and piston for actuating said main valve, an auxiliary valve for said auxiliary cylinder, a rod slidably mounted at each end of the power cylinder and adapted to be engaged alternately by the main piston, arms fixed to said auxiliary valve, said arms being perforated to receive said rods, and a stop on each of said rods adapted to engage said arms, substantially as described.

2. In a device of the class described a cylinder a piston arranged therein and heads on said cylinder, in combination with a rod slidably mounted in each of said cylinder heads, a valve casing, a valve slidably mounted in said casing, projections on said valve extending beyond said casing at each end, arms on said projections, said arms extending into the path of said rods respectively, said arms being perforated to receive said rods, and thrust nuts threaded on said rods, substantially as described.

3. In a device of the class described, a power cylinder and power piston arranged therein a main valve casing cast integrally with said power cylinder, a main valve slidably mounted therein, an auxiliary cylinder and piston an auxiliary valve, means actuated by said power piston at each end of its stroke for shifting said auxiliary valve, an auxiliary piston rod and a rock lever connecting said piston rod and said main valve for shifting the latter, substantially as described.

4. In a device of the class described, a cylinder and a piston arranged therein in combination with a valve casing, a hollow cylindrical valve slidably mounted in said casing, said casing and said valve being open at the ends, a source of fluid pressure supply, ports forming a communication between said casing and said cylinder and between said source of supply and said casing, said valve being provided with peripheral grooves adapted to establish communication through said ports from said source to said cylinder, said valve also being provided with a peripheral exhaust groove and apertures extending through said valve from said exhaust groove to the interior thereof, substantially as described.

In testimony whereof I have signed my name to this specification in the presence of two subscribing witnesses.

HENRY T. FARNSWORTH.

Witnesses:
    D. L. SINGLETON,
    F. L. DAVIS.